Patented Feb. 20, 1945

2,369,691

UNITED STATES PATENT OFFICE 2,369,691

CATALYST MANUFACTURE

Louis Schmerling and Vladimir N. Ipatieff, Chicago, Ill., assignors to Universal Oil Products Company, Chicago, Ill., a corporation of Delaware No Drawing. Application October 10, 1942,
Serial No. 461,603

5 Claims. (Cl. 23—50)

This invention relates to certain novel types of catalysts which have been found useful in various organic reactions, particularly hydrocarbon conversion reactions such as the isomerization of saturated hydrocarbons including paraffins and naphthenes, the alkylation of cyclic and aliphatic hydrocarbons with olefins and the polymerization of unsaturated hydrocarbons.

In one specific embodiment the present invention comprises the production of hydrocarbon conversion catalysts by interacting sulfuric acid and metal halides of the Friedel-Crafts type.

Catalysts of the present character are typified by those produced when sulfuric acid is reacted with aluminum chloride as representing the metal halides of the Friedel-Crafts type. Contrary to what might be expected, the reaction between anhydrous aluminum chloride and concentrated sulfuric acid is not a violent one. For example, when 96% sulfuric acid is added to an equimolar portion of aluminum chloride, little reaction occurs at first. As the mixture is stirred, hydrogen chloride is gradually evolved and the mixture is converted from a pasty mass into a dry white powder. Under the most preferable conditions, approximately 1 molecular portion of hydrogen chloride will have been evolved leaving a catalyst which may be designated as "dichloro-aluminum acid sulfate." This product is probably formed in accordance with the following equation:

(I) 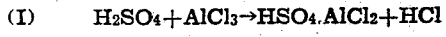
$$H_2SO_4 + AlCl_3 \rightarrow HSO_4.AlCl_2 + HCl$$

This reaction occurs at temperatures below about 120° C. Further heating of the "dichloro-aluminum acid sulfate" at temperatures of the order of 190° C. or higher results in the evolution of additional quantities of hydrogen chloride with the formation of a secondary product probably according to the following equation:

(II) 
$$HSO_4.AlCl_2 \rightarrow SO_4.AlCl + HCl$$

In general, we have found that the dichloro compounds formed in accordance with the conditions for Equation I have greater catalytic activity than the monochloro compounds formed under the conditions of Equation II.

The actual formulae for the catalysts produced when sulfuric acid is interacted with a Friedel-Crafts metal halide, e. g., aluminum chloride, may not correspond exactly to those shown in the two equations. However, it is not intended to limit this invention to any specific catalyst composition. It is apparent that by controlling the temperature and time of reaction and the concentration and amount of sulfuric acid, catalyst masses of varying degrees of activity for different organic reactions may be produced. In the case of aluminum chloride, for example, our invention does not comprise a catalyst of any particular formula but rather the reaction product obtained by interacting aluminum chloride with sulfuric acid under such conditions that not more than two chlorine groups per molecule of $AlCl_3$ are converted to hydrogen chloride. In general, however, we prefer to interact equimolecular proportions of the metal halide and sulfuric acid under such conditions that approximately 1 molecular proportion of hydrogen halide is evolved. Sulfuric acid of from 90 to 100% concentration may be used and under certain circumstances the so-called "fuming" sulfuric acids may be employed containing up to about 20% sulfur trioxide. The aluminum chloride is preferably anhydrous.

As previously indicated, the preferred catalysts of our invention are powdery or granular solids under ordinary conditions of temperature and pressure. They may be used as such or composited with various carriers of a relatively inert character, for example, alumina, silica, activated carbon or char, silica-alumina composites of the synthetic type, silicate minerals and certain acid treated clays or kaolin group minerals, e. g., the montmorillonites, etc. The sulfuric acid-metal halide catalyst complexes may be prepared in the presence of a finely divided carrier in order to produce an intimate mixture of carrier and catalyst or the catalyst itself may be prepared separately and subsequently composited with the carrier.

Aluminum chloride is the preferred Friedel-Crafts type metal halide which should be used in the preparation of the catalysts of our invention since aluminum chloride usually has a somewhat higher catalytic activity than the other metal halides. Other Friedel-Crafts type metal halides which may be reacted with sulfuric acid to form useful alkylating catalysts in accordance with the present invention include aluminum bromide, zinc chloride, zirconium chloride, ferric chloride, antimony chloride, bismuth chloride, the bromides of zinc, zirconium, iron, antimony, and bismuth and others.

Friedel-Crafts metal halide catalysts, particularly aluminum chloride, are effective for various organic condensation reactions and are especially useful in the alkylation and isomerization of hydrocarbons. Aluminum chloride catalysts, however, are usually overactive and are somewhat difficult to handle. The catalysts of the present invention which are produced when aluminum chloride is interacted with sulfuric acid are far less hygroscopic than aluminum chloride, and are, therefore, handled more conveniently. Moreover, in contrast to the aluminum chloride or other Friedel-Crafts catalysts described in the prior art, the modified catalysts of the present invention are not over active, and because of their greater selectivity, undesirable side reactions may be substantially minimized. The formation of sludge-like complexes or "lower layer" is avoided to a considerable extent with the result that our catalysts may be used in a continuous process over long periods of time.

Catalysts of the present character find application in isomerizing paraffinic and naphthenic hydrocarbons. When such reactions are brought about in the presence of these catalysts, the degree of conversion is usually greater when minor proportions of hydrogen halides are present in the reaction zone. The catalysts may also be employed in reactions wherein aromatic, naphthenic or isoparaffinic hydrocarbons are reacted with aliphatic or cyclic olefins or olefin-producing substances such as alcohols, alkyl halides, etc. to add alkyl groups and form compounds of higher molecular weight. The present types of catalysts can also be advantageously used in effecting miscellaneous types of polymerization reactions such as, for example, the polymerization of normally gaseous olefin hydrocarbons to produce polymers of gasoline boiling range or higher molecular weight. In all of these types of conversion reactions, the course of the reaction and the type of products may be modified by conducting operations in the presence of added hydrogen.

The catalysts may be employed either as irregularly shaped granules, in the form of pellets or extrudates, or in powdered form, and continuous types of operations may be modified in accordance with the form and subdivision of the catalyst. For example, pellets or granules may be used in the stationary bed type of operation in which the catalyst particles are contained in a reaction chamber and the reactants are passed through the catalyst at suitably adjusted temperatures, pressures and rates of flow. In other cases, the finely powdered catalyst may be suspended in a liquid reactant and the suspension passed through a reaction zone at chosen conditions of temperature, pressure and flow rate. The catalysts may also be used in the so-called "fluidized catalyst" type of operation in which a stream of reactants is passed through a mass of finely divided catalyst in relatively high weight proportion to the reactants. In this operation the powdered catalyst is either maintained in a circulating or turbulent condition in the reactor without removal of any substantial proportion of the catalyst from the reaction chamber or a portion of the catalyst is carried out with the stream of reactants and later separated and returned for further use.

The following examples are introduced to illustrate the method of manufacture of the present types of catalysts and some results obtainable in their use in certain hydrocarbon conversion reactions. However, it is not intended to unduly limit the scope of the invention in exact correspondence with the examples presented.

*Example I*

A catalyst was prepared by reacting equimolar portions of anhydrous aluminum chloride and 96% sulfuric acid. More specifically, 5.2 parts by weight of 96% sulfuric acid was added to 6.5 parts by weight of aluminum chloride in a reaction vessel. As the reaction proceeded a slowly accelerated evolution of hydrogen chloride took place and as the mixture was stirred it changed from a pasty, foamy mass to one having a dough-like consistency which finally crumbled into a dry white powder. Approximately 9.5 parts by weight of this dry powder was obtained as the final catalyst. The product apparently had the formula $HSO_4 \cdot AlCl_2$. This material was found to react vigorously with water.

The "dichloro-aluminum acid sulfate" catalyst thus prepared was found to be effective for the alkylation of benzene with propylene at room temperature and also for the alkylation of isobutane with propylene in the presence of HCl at 40° C. The catalyst was also active for the polymerization of cyclohexene at room temperature and for the cross polymerization of propylene with isobutylene at 30–50° C. At a temperature of 100–125° C. the catalyst had substantial activity for the isomerization of normal pentane and normal heptane.

*Example II*

Another catalyst was prepared similar to that obtained in Example I but 100% sulfuric acid was employed in the preparation steps. Approximately 9.8 parts by weight of 100% sulfuric acid was reacted with 13.3 parts by weight of aluminum chloride. During 15 minutes of mixing at room temperature very little reaction occurred but when the mixture was heated to about 90–110° C., hydrogen chloride began to be evolved and after a short time a total of 19.5 parts by weight of a white powder was obtained. When this catalyst was analyzed it was found to contain on a weight basis 14.5% Al, 39.1% Cl, and 46.5% $SO_4$. This corresponds to a ratio of $Al:Cl:SO_4$ of 1.00:2.05:0.90. It is apparent, therefore, that the principal component of the catalyst was the "dichloro-aluminum acid sulfate" having the empirical formula $HSO_4 \cdot AlCl_2$.

The catalyst thus prepared was found to possess excellent activity for the isomerization and alkylation reactions. Using this catalyst, isobutane was successfully alkylated with propylene at temperatures of from 40–80° C. The alkylation of isobutane with ethylene was also effected at 60° C. in which case the product consisted chiefly of hexanes. Benzene was also successfully alkylated with normal propyl chloride, cyclohexene, and also with ethylene using the same catalyst. At a temperature of 125° C. isomerization of normal heptane was produced using the present catalyst along with 3 weight per cent of hydrogen chloride as a promoter.

*Example III*

Two catalysts were prepared by reacting aluminum chloride with approximately 1.2 and 1.5 molecular equivalents of 100% sulfuric acid in order to make certain that no unreacted aluminum chloride would be present.

The first catalyst using 1.2 molecular equivalents of sulfuric acid was prepared by adding 23.5 parts by weight of 100% sulfuric acid at room temperature to 26.6 parts by weight of powdered aluminum chloride. A thin paste resulted which when heated to 90° C. began to evolve hydrogen chloride. When the reaction was complete, 40.7 parts by weight of a light yellowish powder was obtained indicating a loss of 9.4 parts by weight of hydrogen chloride.

The second catalyst employing 1.5 molecular equivalents of sulfuric acid was prepared by mixing 29.4 parts by weight of 100% sulfuric acid with 26.6 parts by weight of aluminum chloride to form a pasty mixture. When heated to 90° C. a vigorous reaction was initiated and the temperature thereafter was controlled at 80–105° C. When the reaction was complete 48.0 parts by weight of a light yellow granular product was obtained indicating the loss of 8.0 parts by weight of hydrogen chloride.

When either of these catalysts was extracted with ether, no aluminum chloride was removed. Similarly, when the catalysts were extracted with nitromethane no aluminum chloride could be detected in the extracts as evidenced by the fact that when benzene was added a colorless solution resulted in each case. If aluminum chloride had been present an orange colored solution would have resulted.

Both of these catalysts were found to be effective in the alkylation of benzene with isopropyl chloride at room temperature and atmospheric pressure. In addition the second catalyst was found to have appreciable activity in the alkylation of isobutane with propylene at 60° C. in the presence of 2 weight per cent hydrogen chloride and also for the alkylation of isobutane with ethylene at 60° C. and in the presence of hydrogen chloride.

*Example IV*

The catalyst of the present example was prepared by heating 37.5 parts by weight of the "dichloro aluminum acid sulfate" catalyst prepared according to the procedure of Example II in a glass lined rotating autoclave at 190° C. under 30 atmospheres initial pressure. Approximately 27.5 parts by weight of yellowish granules and powder was recovered. This catalyst probably had the formula $SO_4.AlCl$ as hereinbefore described.

The reaction of benzene with isopropyl chloride to yield isopropyl benzene took place rather slowly at 40° C. in the presence of this catalyst. It is evident, therefore, that although the compound has definite catalytic properties, it is a much weaker catalyst than the "dichloro" catalyst described in connection with Example II.

We claim as our invention:

1. A composition of matter composed of elements in the proportions corresponding to the formula $AlCl_2.HSO_4$.

2. A catalyst preparation method which comprises reacting equimolar proportions of an anhydrous aluminum halide of the Friedel-Crafts type with concentrated sulfuric acid under conditions such that hydrogen halide is liberated in an amount equal to at least one mol but not exceeding two mols per mol of aluminum halide present.

3. A catalyst preparation method which comprises reacting equimolar proportions of an anhydrous aluminum halide of the Friedel-Crafts type with sulfuric acid of from 90 to 100 per cent concentration at a temperature not substantially in excess of about 190° C. and liberating hydrogen halide in an amount equal to at least one mol but not substantially in excess of two mols per mol of aluminum halide present.

4. A catalyst preparation method which comprises reacting equimolar proportions of anhydrous aluminum chloride with sulfuric acid of from 90 to 100 per cent concentration at a temperature not in excess of about 120° C. and liberating about one mol of hydrogen chloride per mol of aluminum chloride present.

5. A catalyst preparation method which comprises reacting equimolar proportions of anhydrous aluminum chloride with sulfuric acid of from 90 to 100 per cent concentration at a temperature not in excess of about 190° C. and liberating about two mols of hydrogen chloride per mol of aluminum chloride present.

LOUIS SCHMERLING.
VLADIMIR N. IPATIEFF.